(12) United States Patent
Wilhelmsson

(10) Patent No.: US 9,383,247 B2
(45) Date of Patent: Jul. 5, 2016

(54) LEVEL MEASUREMENTS IN METALLURGICAL VESSELS

(75) Inventor: Tomas Wilhelmsson, Motala (SE)

(73) Assignee: AGELLIS GROUP AB, Lund (SE)

( * ) Notice: Subject to any disclaimer, the term of this patent is extended or adjusted under 35 U.S.C. 154(b) by 211 days.

(21) Appl. No.: 14/345,150

(22) PCT Filed: Sep. 11, 2012

(86) PCT No.: PCT/SE2012/050956
§ 371 (c)(1),
(2), (4) Date: Mar. 14, 2014

(87) PCT Pub. No.: WO2013/039446
PCT Pub. Date: Mar. 21, 2013

(65) Prior Publication Data
US 2014/0366625 A1    Dec. 18, 2014

Related U.S. Application Data

(60) Provisional application No. 61/626,309, filed on Sep. 26, 2011.

(30) Foreign Application Priority Data

Sep. 15, 2011 (SE) ...................................... 1150836

(51) Int. Cl.
*G01F 23/00* (2006.01)
*G01F 23/284* (2006.01)
*G01F 23/26* (2006.01)
*F27D 21/00* (2006.01)
*B22D 2/00* (2006.01)
*B22D 46/00* (2006.01)

(52) U.S. Cl.
CPC .............. *G01F 23/284* (2013.01); *B22D 2/003* (2013.01); *B22D 46/00* (2013.01); *F27D 21/0028* (2013.01); *G01F 23/26* (2013.01)

(58) Field of Classification Search
None
See application file for complete search history.

(56) References Cited

U.S. PATENT DOCUMENTS 4,138,888 A    2/1979 Linder
4,144,756 A    3/1979 Linder
(Continued)

FOREIGN PATENT DOCUMENTS

CN        2114814      9/1992
EP        0111228      6/1984
(Continued)

OTHER PUBLICATIONS

International Search Report for PCT/SE2012/050956, Completed by the Swedish Patent Office on Nov. 22, 2012, 5 pages.
(Continued)

*Primary Examiner* — Andre Allen
(74) *Attorney, Agent, or Firm* — Brooks Kushman P.C.

(57) ABSTRACT

The vertical filling level of electrically conductive material in a cavity of a metallurgical vessel is measured by a system including a transmitting conductor for generating an electromagnetic field when connected to an alternating power source, and a receiving conductor which senses the electromagnetic field for generation of an output signal. The conductors are arranged inside a metal casing of the vessel to co-extend with a mutual spacing defining a spacing area that faces the cavity and extends along the periphery in an essentially closed loop. The mutual spacing is selected such that changes in the output signal is dominated by changes to the electromagnetic field caused by local changes in the amount of the conductive material adjacent the spacing. Part of the spacing area defines a vertical measurement region slanted along the periphery so as to diverge from the horizontal and vertical directions of the vessel.

22 Claims, 6 Drawing Sheets

(56) References Cited

U.S. PATENT DOCUMENTS

| | | | |
|---|---|---|---|
| 4,475,083 A | 10/1984 | Linder | |
| 4,708,191 A | 11/1987 | Block et al. | |
| 4,887,798 A | 12/1989 | Julius | |
| 2011/0272866 A1* | 11/2011 | Shameli | F27B 3/085 266/78 |

FOREIGN PATENT DOCUMENTS

| | | | | |
|---|---|---|---|---|
| EP | 0186584 | 7/1986 | | |
| EP | 0187993 | 7/1986 | | |
| FR | 2858401 | 2/2005 | | |
| GB | 2312283 | 10/1997 | | |
| JP | 62016870 | 1/1987 | | |
| JP | WO 2013132746 A1 * | 9/2013 | ............ | B81B 3/0021 |

OTHER PUBLICATIONS

Chinese Search Report for Chinese Application No. CN 2012800445358, Completed by the Chinese Patent Office, Dated Nov. 23, 2015, 2 Pages.

Zhang et al. Chinese Journal of Materials Research Dec. 1997, vol. 11, No. 6, English Abstract attached to original, All together 13 Pages, "Elecromagnetic Shaping and Solidification of Metal Melt".

* cited by examiner

LEVEL MEASUREMENTS IN METALLURGICAL VESSELS

CROSS-REFERENCE TO RELATED APPLICATIONS

This application is the U.S. national phase of PCT Application No. PCT/SE2012/050956 filed on Sep. 11, 2012, which claims priority to SE Patent Application No. 1150836-3 filed on Sep. 15, 2011, and the benefit of U.S. Provisional Application 61/626,309 filed on Sep. 26, 2011, the disclosures of which are incorporated in their entirety by reference herein.

TECHNICAL FIELD

The present invention relates to techniques for electromagnetically measuring a vertical filling level of a bath of electrically conductive material contained within a metallurgical vessel.

BACKGROUND ART

In industries, primarily metallurgical industries, in which molten metal is handled there is a great need for systems for measuring or estimating the position or average level of the interface between the molten metal and non-conducting media in a metallurgical vessel such as a ladle, tundish, mould, a furnace, etc. Due to the specific harsh conditions encountered in connection with such industry, such as high temperatures, corrosive materials, different electrically conducting materials in the vessels and surroundings, up to now it has proved to be difficult to provide a general technique for such level measurement.

Some dominating techniques for level estimation in the metallurgical industry include weight measurements, radioactive systems and electromagnetic systems. Weight measurements are indirect, and radioactive systems have a limited range and do not separate between conductive or non-conductive media. Electromagnetic systems have been successfully deployed in a variety of vessels, such as ladles, tundishes and furnaces. These vessels have a metal housing, often provided with an inner ceramic lining to manage heat and abrasive materials. Electromagnetic sensors may be placed behind the lining so as to be protected from the excessive heat from the molten metal. The electromagnetic sensors include a combination of one or more transmitter coils and one or more receiver coils. The transmitter coil may be driven at a low frequency of 100 Hz to a few kHz to generate a time-varying magnetic field. Many lining materials are transparent at these frequencies which allows the magnetic field to reach the molten metal and induce eddy currents therein. The eddy currents generate fields that induce an electromotive force (emf) in the receiving coil, which may be detected to represent the amount of molten metal within the extent of the coils. The transmitter and receiver coils are traditionally designed as flat square coils arranged on the sides of the vessel or on top of each other on one side of the vessel. This results in installation limitations.

The magnetic field generated by a coil is inherently non-linear, where the strength of the magnetic field drops with distance (R) to the coil conductor by 1/R near the coil conductor and by $1/R^3$ when the distance R is large relative to the extent of the coil. Unless special care is taken, this results in a non-linear transfer function, i.e. a non-linear dependence between electromotive force in the receiver coil and vertical filling level in the vessel. Such non-linearity is e.g. illustrated in U.S. Pat. No. 4,144,756, in which the transmitter and receiver coils are arranged coaxially and separated in the axial direction in the lining of a metallurgical vessel. The dependence of measurement signal on filling level is highly non-linear with inflexion points being formed at the horizontal axes of the coils.

Several techniques have been applied to make the transfer function more linear relative to the vertical filling level.

In U.S. Pat. No. 4,475,083, a flat single-turn transmitter coil and a flat single-turn receiver coil are arranged vertically in the lining of a furnace wall, so as to overlap each other and extend parallel to the periphery of the molten metal. A detection circuit is connected to the transmitter coil to detect a phase shift between the alternating current supplied to the transmitter coil and the resulting electromagnetic alternating field at the receiver coil. This coil arrangement is stated to result in a measurement signal which may sufficiently linear to signify unambiguity between signal value and measured value.

In U.S. Pat. No. 4,708,191, a rectangular transmitter coil is installed in the lining of a metallurgical vessel to extend in the horizontal and vertical directions of the vessel. At least two rectangular receiver coils are aligned with and staggered vertically within the transmitter coil to cover various surface areas of the transmitter coil. The coil arrangement may be designed to generate a measurement signal proportional to level, with crossover points generated in the measurement signal by the placement of the receiving coils within the transmitter coil.

The coil arrangements of the prior art have proven to be less suited in many practical situations, e.g. when measuring on a constantly changing three-dimensional interface between a conducting and a primarily non-conducting medium, e.g. a tumultuous or turbulent top surface of molten metal. This is partly due to the fact that the vertical range with linear signal dependence is substantially less than the physical height of the coil arrangement. When turbulent portions of the top surface reach outside this vertical range, the induced eddy currents in these turbulent portions may drive the measurement signal in opposite direction relative to the actual physical movement. This may lead to significant errors in the measured filling level. Mother problem is that the extent of the vertical range may drift over time, making it difficult to maintain the techniques for linearization of the measurement signal.

The prior art also includes U.S. Pat. No. 4,887,798, EP0187993 and EP0111228, which disclose techniques for detecting a flow of molten metal through an outlet in a metallurgical vessel. Transmitter and receiver coils are arranged concentrically around the opening, and the receiver coil is operated to detect electromotive forces originating from eddy currents generated in the molten metal by an alternating current through the transmitter coil. This enables detection of presence or absence of molten metal at the level of the concentric coils.

The prior art also comprises EP0186584, which discloses level detection in a horizontally arranged cylindrical metal pipe. A pair of conductors are wound onto the outer surface of the metal pipe to form a concentrically arranged pair of transmitting and receiving coils. The amount of conductive material inside the pipe is measured based the electromotive forces generated in the receiving coil by an alternating current through the transmitter coil.

SUMMARY

It is an objective of the invention to at least partly overcome or alleviate one or more of the above-identified limitations of the prior art.

Another objective is to enable installation of an electromagnetic sensor for level measurement irrespective of the shape of the metallurgical vessel.

Yet another objective is to enable the transfer function of the electromagnetic sensor to be tailored to the need of a specific measurement situation.

A specific objective is to provide an electromagnetic sensor for level measurement with a transfer function which is linear within the vertical extent of the sensor and lacks turning points at the limits of the vertical extent.

One or more of these objectives, as well as further objectives that may appear from the description below, are at least partly achieved by means of a system, a metallurgical vessel, methods according to the independent claims, embodiments thereof being defined by the dependent claims.

A first aspect of the invention is a system for measuring a vertical filling level of electrically conductive material in a containment volume of a metallurgical vessel, the metallurgical vessel being defined by an outer metal casing that surrounds the containment volume and extends in a vertical direction. The system comprises: a transmitting conductor for generating an electromagnetic field when connected to an alternating power source, a receiving conductor which is arranged to sense the electromagnetic field for generation of an output signal as a function of the vertical filling level, wherein the transmitting and receiving conductors are arranged inside the metal casing to co-extend with a mutual spacing to define a spacing area that faces the containment volume and extends along the periphery of the containment volume in an essentially closed loop, wherein the mutual spacing is selected such that changes in the output signal is dominated by changes to the electromagnetic field caused by local changes in the amount of conductive material adjacent to said spacing area, and wherein at least part of the spacing area defines a vertical measurement region in which the spacing area is slanted along the periphery so as to diverge from the horizontal and vertical directions of the vessel.

According to the first aspect, the transmitting and receiving conductors thus extend as a pair in a loop inside the metal casing along the periphery of the containment volume, which is intended to hold the conductive material. By forming the paired loop inside the casing it is ensured that the contribution from eddy currents in the molten material is a detectable part of the total electromotive force in the receiver conductor. By arranging the spacing area, defined between the transmitting and receiving conductors, to face the containment volume it is possible to optimize the response of the receiver coil such that changes in the output signal is dominated by local changes in the amount of molten material adjacent to the spacing area, i.e. the local conductivity, in the local region at the periphery of the containment volume directly opposing the spacing area. It is understood that the mutual spacing may be selected in relation to other design/control parameters of the vessel and the system, such as the horizontal distance from the spacing area to the periphery of the containment volume, provision of lining material between the spacing area and the periphery, the frequency and magnitude of the alternating power source, etc.

When the signal changes are dominated by local changes, the response of the receiver coil may be represented as a summation of the local response of individual segments of the receiver coil along its extent, i.e. along the loop. This in turn makes is possible to achieve any monotonically decreasing transfer function of the loop within different regions of its vertical extent. As used herein, the "transfer function" represents, as a function of vertical filling level, the total induced electromotive force in the receiving conductor normalized by supplied power (current) to the transmitting conductor. The transfer function is given by the arrangement of the pair of conductors, i.e. the spacing area, inside the casing. This includes the shape of the loop, but may also include the local mutual spacing between the transmitting and receiving conductors, and the local horizontal distance from the spacing area to the periphery of the containment volume.

Thus, it is realized that the system of the first aspect enables a linear transfer function within the vertical measurement region.

By designing the loop so as to include a portion in which the spacing area is slanted along the periphery of the containment volume, it is possible to distribute the loop over a large part of the containment volume, irrespective of the shape of the containment volume. Furthermore, for a given extent of the vertical measurement region, a slanted spacing area results in a longer extent of the receiving conductor along the periphery of the containment volume within the vertical measurement region. Thereby, compared to a spacing area that extends in the vertical direction along the periphery within the vertical measurement region, the slanted spacing area induces eddy currents within a larger area on the periphery. Thus, the slanted spacing area results in a larger contribution to the electromotive force of the receiving conductor from the conductive material in the containment volume. This technical advantage may be used to increase the signal resolution in the vertical direction and/or to improve the signal quality. By using a slanted spacing area it is also possible to distribute the loop such that one or more dedicated turning points are generated in the output signal, or to avoid such turning points altogether, even when the filling level extends beyond the vertical limits of the loop.

As used herein, the "mutual spacing" refers to the smallest distance to the receiving conductor at every given point along the transmitting conductor.

As used herein, "slanted" is intended to indicate that the extent of the spacing area, along the transmitting and receiving conductors and as projected through the spacing area onto the periphery of the containment volume, deviates from the horizontal and vertical directions. As used herein, the vertical direction is the direction of gravity, and the horizontal direction is a direction in a horizontal plane perpendicular to the vertical direction.

The spacing area may be arranged to face the containment volume to different degrees. In one embodiment, the spacing area is arranged to be essentially parallel to the periphery within the vertical measurement region, as seen in a cross-section perpendicular to the extent of the conductors. Such an embodiment may optimize the sensitivity of the measurement system. In other embodiments, the spacing area is inclined away or towards the periphery by an angle which is less than 90°, and typically less than 45°, 35°, 25°, 15°, 10° or 5°, as seen in a cross-section perpendicular to the extent of the conductors.

Measuring the vertical filling level according to the first aspect includes the task of identifying the location of an interface between the electrically conductive material and a region of lower conductivity, such as an interface between molten metal and air or between molten metal and a slag layer. However, measuring the vertical filling level may involve a mere detection of presence or absence of electrically conductive material within the vertical extent of the loop or within the vertical measurement region.

There are a number of design criteria that may be used, either alone or in any combination, to make changes in the output signal dominated by local changes in the amount of molten material adjacent to the spacing area.

According to one such criterion, the mutual spacing is selected to ensure that electromagnetic coupling between the transmitting and receiving conductors is primarily achieved between opposing segments of the transmitting and receiving conductors along the spacing area.

According to another criterion, the mutual spacing is selected such that the strength of the electromagnetic field, in absence of conductive material in the containment volume, falls as a function of $1/R^\alpha$, with R being the distance from the transmitting conductor in the spacing area and a being in the range of 1-2. By this criterion it is ensured that the receiving conductor is arranged in the near-field of the transmitting conductor, enabling a high local sensitivity to presence and absence of molten material at the periphery of the containment volume.

According to yet another criterion, the spacing area is arranged such that the electromagnetic field generated by the transmitting conductor at the receiving conductor, in absence of conductive material in the containment volume, is approximated by an electromagnetic field generated around a straight conductor of infinite length. This criterion enables a high local sensitivity to presence and absence of molten material at the periphery of the containment volume.

According to a further criterion, the transmitting conductor is arranged such that its horizontal extent is less than about $1/10$, $1/15$ or $1/20$ of the total length of the transmitting conductor. By this criterion it is avoided that strong electromagnetic fields are generated at certain vertical positions to disturb the local coupling between opposing segments in this or other vertical positions. In one specific embodiment, the transmitting conductor is arranged to be essentially free of portions with a horizontal extent.

According to a still further criterion, if the metallurgical vessel further comprises a protective lining arranged inside the metal casing so as to define an inner wall spaced from the metal casing and defining the periphery of the containment volume, the transmitting and receiving conductors are arranged with a horizontal separation between the spacing area and the inner wall, wherein the mutual spacing is selected to be at least of the same order of magnitude as the horizontal separation. Depending on implementation, the transmitting and receiving conductors may be arranged within the lining or between the lining and the metal casing. This criterion may be implemented such that the ratio between the mutual spacing and the horizontal separation is in the approximate range of 0.5-5.

There are also a number of design criteria that may be used, either alone or in any combination, to achieve a linear transfer function of the system, i.e. to obtain a linear dependence between the output signal (or a parameter embedded in the output signal) and vertical filling level in the vertical measurement region.

According to one such criterion, the transmitting conductor is arranged such that the average strength of the electromagnetic field in the molten material at the periphery of the containment volume facing the spacing area is essentially independent of vertical position within the vertical measurement region. In other words, presence of molten material yields the same change in signal strength at all heights. Given that response is local, and thus that the total response of the receiver coil is given by a summation of local responses, this criterion may yield a linear transfer function.

According to another criterion, the mutual spacing is selected such that a horizontal distance from the receiving conductor to the periphery of the containment volume is essentially invariant within the vertical measurement region. This criterion may ensure that the local response to molten metal is essentially the same along the loop. This may in turn simplify both the design of the system and the installation of the transmitting and receiving conductors in the vessel. It is to be understood that "essentially invariant" is a nominal criterion which includes installation tolerances, which may e.g. amount to ±20°, ±15°, ±10° or ±5°. It is also to be noted that the horizontal distance may change over time, e.g. as a result of abrasion of the lining material.

According to another criterion, the mutual spacing is essentially the same along the spacing area within the vertical measurement region. Like the foregoing criterion, it may simplify both the design of the system and the installation of the transmitting and receiving conductors in the vessel. Like in the foregoing criterion, "essentially invariant" is a nominal criterion which may include the above-mentioned installation tolerances.

According to yet another criterion, the spacing area is arranged so as to yield approximately the same sensing length for different heights in the vertical direction within the vertical measurement region, the sensing length being the total extent of the spacing area along the transmitting and receiving conductors within a horizontal slice taken at a given height in the vertical direction.

According to still another criterion, the spacing area is arranged such that a total electromotive force induced in the receiving conductor by the electromagnetic field is an essentially linear function of the vertical filling level in the vertical measurement region.

In one embodiment, the spacing area is arranged such that a total electromotive force induced in the receiving conductor by the electromagnetic field is essentially invariant of the vertical filling level when the vertical filling level extends outside the vertical measurement region. This embodiment enables an output signal without turning points. In this context, a turning point means that the derivative of the transfer function changes sign at a certain height. As noted in the Background section, the presence of turning points is inherent in prior art techniques and may cause large errors in estimated filling level if the measurements are made under turbulent conditions in the conductive material.

In one embodiment, the vertical measurement region spans the extent of the loop in the vertical direction. This means that the spacing area is slanted along essentially the entire loop. Such an embodiment will maximize the extent of the vertical measurement region. The layout of the spacing area may e.g. be designed to yield a linear transfer function for the entire vertical extent of the loop and/or so as to yield a transfer function without turning points outside the vertical extent of the loop.

In one embodiment, the transmitting and receiving conductors are arranged such that the loop encloses a vertical center line of the containment volume. This will ensure that the loop is arranged so as to collect the local response from a large part of the containment volume. Recalling that the total response for a given height is represented as a sum of all local responses along the loop at this given height, it is realized that this embodiment will improve the precision of the measurement.

In one implementation, the loop is designed to surround the containment volume. In one such implementation, the containment volume is at least partially defined by an essentially cylindrical wall portion extending around the vertical center line, wherein the loop is formed in the cylindrical wall portion so as to surround the containment volume. In this context, "the cylindrical wall portion" may define any cross-section of the containment volume, e.g. circular, elliptical, rectangular, or any other shape.

In one embodiment, the system further comprises a second transmitting conductor for generating an electromagnetic field when connected to an alternating power source, and a second receiving conductor which is arranged to sense the electromagnetic field for generation of a second output signal, wherein the second transmitting and receiving conductors are arranged inside the metal casing at a vertical position within the vertical measurement range, to co-extend horizontally around the containment volume with a mutual spacing. This embodiment enables compensation for drifts in the vessel and the system, since the second transmitting and receiving conductors may be arranged to generate a step change in the second output signal when the vertical filling level coincides with the vertical position, the vertical position of the step change being essentially unaffected by the drifts. By mapping the location of the step change to the output signal of the loop within the slanted spacing area, it is thus possible to compensate for drifts in the output signal.

In one embodiment, the system further comprises an alternating power source connected to the transmitting conductor.

In one embodiment, the system further comprises a processing unit configured to obtain and process the output signal for extracting a measure representative of the vertical filling level.

A second aspect of the invention is a metallurgical vessel comprising the system of the first aspect.

A third aspect of the invention is a method of measuring a vertical filling level of electrically conductive molten material in a containment volume of a metallurgical vessel, the metallurgical vessel being defined by an outer metal casing that surrounds the containment volume and extends in a vertical direction. The method comprises: installing a transmitting conductor to generate an electromagnetic field inside the metallurgical vessel, and installing a receiving conductor inside the metallurgical vessel to sense the electromagnetic field for generation of an output signal as a function of the vertical filling level, wherein the transmitting and receiving conductors are installed inside the metal casing to co-extend with a mutual spacing to define a spacing area that faces the containment volume and extends along the periphery of the containment volume in an essentially closed loop, wherein the mutual spacing is selected such that changes in the output signal is dominated by changes to the electromagnetic field caused by local changes in the amount of molten material adjacent to said spacing area, and wherein at least part of the spacing area is arranged to define a vertical measurement region in which the spacing area is slanted along the periphery so as to diverge from the horizontal and vertical directions of the vessel.

A fourth aspect of the invention is a method of operating the system of the first aspect. The method comprises: supplying an alternating power to the transmitting conductor, obtaining the output signal from the receiving conductor, and processing the output signal for extracting a measure representative of the vertical filling level.

Any one of the embodiments of the first aspect can be combined with the second to fourth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
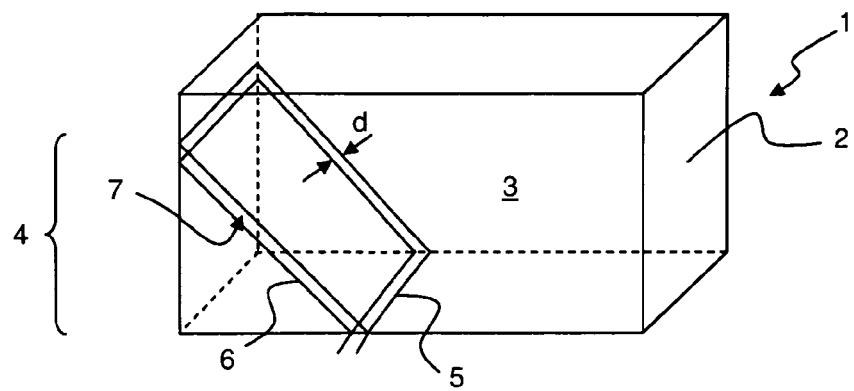
FIG. 1 is a perspective view of a metallurgical vessel with a level measurement system.

In the following, a few example embodiments of the present invention will be described for illustration purposes only. Throughout the description, the same reference numerals are used to identify corresponding elements.

Before turning to the example embodiments, a few basic definitions and explanations will be given.

As used herein, an "electromagnetic field" is a physical field produced by moving electrically charged objects. It affects the behavior of charged objects in the vicinity of the field. The electromagnetic field extends indefinitely throughout space. The field may be viewed as a combination of an electric field E and a magnetic field B, each being a three-dimensional vector field. Each of the vector fields have a value defined at every point of space and time and are may be regarded as functions of the space and time coordinates. The electric field is produced by stationary charges, and the magnetic field by moving charges (currents).

The term "electromagnetic coupling" (also known as "inductive coupling") refers to the phenomenon that a change in current flow through a first conductor induces a voltage across the ends of a second conductor through electromagnetic induction. The amount of electromagnetic coupling between two conductors is measured by their mutual inductance. The mutual inductance quantifies the production of "electromotive force" (emf) in the second conductor by the current change in the first conductor. The induced electromotive force $\epsilon$ of a closed loop C in the presence of a varying magnetic field B is a voltage given by the integral of the electric field around the stationary closed path of the loop:

$$\epsilon = \oint_c E \cdot dl$$

where E is the entire electric field, and the integral is around an arbitrary but stationary closed curve C through which there is a varying magnetic field.

Eddy currents (also known as "Foucault currents") are currents induced in a conductive material when exposed to a time-varying magnetic field. The currents are formed as circulating eddies which have inductance and thus induce magnetic fields. The stronger the applied magnetic field, or the greater the electrical conductivity of the conducting material, or the faster the field changes, then the greater the eddy currents that are developed and the greater the fields produced.

Embodiments of the present invention relate to level measurement in metallurgical vessels by detecting an alternating voltage which is induced in a receiving coil by an alternating current supplied to a transmitting coil. The alternating current also induces eddy currents in the conductive material which is being processed within the vessel, and the magnetic field produced by these eddy currents change the magnetic field at the receiving coil, so as to cause a change in the induced voltage (emf) in the receiving coil. One challenge is to achieve a useful and predictable functional relation between output signal and the amount of conductive material in the vessel, i.e. the filling level.

FIG. 1 illustrates a metallurgical vessel 1 with an outer casing or jacket 2 of metal that defines an inner cavity 3 (containment volume) for an electrically conductive material to be processed in the vessel 1. The vessel 1 may be any type of metallurgical vessel, such as a furnace, a tundish, a ladle, a mould, etc. The conductive material may be a metal or a semi-conductor, typically heated to liquid state, but alternatively in the form of a powder or a granulate. For simplicity, the conductive material will be referred to as "molten material" in the following. A coil arrangement 4 is installed inside the casing 2 to surround a portion of the cavity 3. The coil arrangement 4 is formed by a transmitting conductor 5 and a receiving conductor 6 which are drawn around the cavity 3 as a co-extending line pair with a given mutual spacing d. The conductors 5, 6 thus form a transmitter coil and a receiver coil which are displaced from each other by the mutual spacing d in parallel to the periphery of the cavity 3. Conceptually, this may be viewed as a "spacing area" 7 being formed between the conductors 5, 6 around the cavity 3. As seen in FIG. 1, the spacing area 7 is partly slanted across the periphery of the cavity 3.

Figure 2:
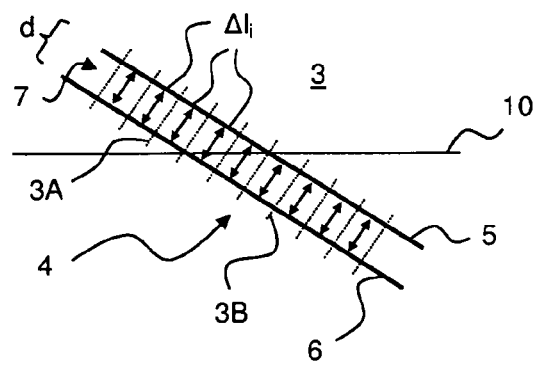
FIG. 2 is an enlarged side view of a part of a conductor pair in the measurement system of FIG. 1.

FIG. 2 is an enlarged view of the slanted portion of the co-extending conductors 5, 6 as seen in an elevated side view, i.e. projected onto the periphery of the cavity 3. In FIG. 2, the cavity 3 is partially filled with a molten metal, which thus defines a top surface 10. The coil arrangement 4 is arranged such that the electromagnetic coupling between the conductors primarily occurs between opposing line segments ($\Delta l_i$) along the slanted portion, as indicated by the double-ended arrows. Thereby, the line segments experience two types of environments, either with presence of conductive material or absence of conductive material.

Figure 3A:
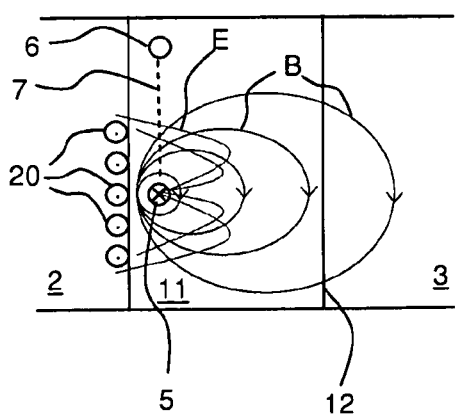
FIGS. 3A and 3B are section views perpendicular to the conductor pair in FIG. 2 without and with, respectively, interaction between a generated electromagnetic field and molten metal in the vessel.

FIG. 3A is a view of a slice along the dotted line 3A in FIG. 2, i.e. with absence of molten material in the cavity 3 adjacent to the line segment. In the illustrated example, the conductors 5, 6 are embedded in a lining material 11 that provides a cavity-defining wall 12. Any type of conventional lining material may be used, e.g. refractory brickwork or rammed or cast refractory material forming a monolithic lining. There is thus a certain horizontal distance between the spacing area 7 and the wall 12. FIG. 3A illustrates the magnetic field B and the electric field E generated by the transmitting conductor 5 and sensed by the receiving conductor 6, as well as eddy currents 20 that are generated in the metal casing 2. As seen, the magnetic field B extends into the cavity 3. In the illustrated example, the spacing area 7 is essentially parallel to the periphery of the cavity 3, although it is conceivable for the spacing area 7 to be tilted towards or away from the cavity 3.

Figure 3B:
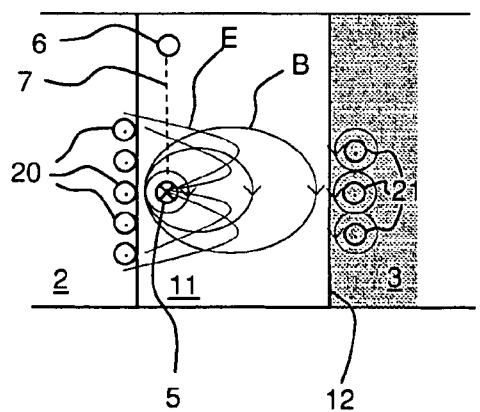

FIG. 3B is a view of a slice along the dotted line 3B in FIG. 2, i.e. with presence of conductive material in the cavity 3 adjacent to the line segment. As shown, the magnetic field B induces eddy currents 20 in the metal casing 2 as well as eddy currents 21 in the molten material at the wall 12, i.e. at the periphery of the cavity 3. The eddy currents 21 in the molten metal causes a reduction in the strength of the magnetic field B that passes around the receiving conductor 6. Thereby, the coupling between the transmitting conductor 5 and the receiving conductor 6 is locally reduced. The mutual spacing of the conductors 5, 6 is such that the receiving conductor 6 is located in the near-field of the magnetic field B generated by the transmitting conductor 5. In the absence of conductive material in the local environment of the line segment, the magnetic field would drop at a rate proportional to $1/R^\alpha$, typically with $\alpha=1$, or at least $\alpha$ being in the range of 1-2, and R being the perpendicular distance from the transmitting conductor 5. In the presence of conductive material in the local environment of the line segment, the magnetic field drops at a steeper rate. Thereby, each line segment may be represented as a partial on/off switch for the line segment, with respect to the electromotive force generated in the receiving conductor 6, where the operation of the switch is controlled by the presence and absence of molten metal. The induced emf $\Delta\epsilon_i$ for line segment i along the coil arrangement 4 may be described as $$\Delta\epsilon_i = \Delta\epsilon_{empty,i} - \Delta\epsilon_{eddy,i}$$

where $\Delta\epsilon_{empty,i}$ is the induced emf in the absence of adjacent molten metal, and $\Delta\delta_{eddy,i}$ is the reduction in induced emf as a result of the eddy currents 21 in adjacent molten metal. In the absence of adjacent molten metal, $\Delta\epsilon_{eddy,i}=0$. In the presence of adjacent molten metal, $\Delta\epsilon_{eddy,i}$ has a value that depends on the specific configuration of the individual line segment. The total response of the coil arrangement 4, i.e. the total induced emf along the coil arrangement 4, may be represented as a sum of the induced emf for all line segments:

$$\epsilon = \epsilon_{empty} - \beta \cdot f(h)$$

where $\epsilon_{empty}$ is the induced emf when the cavity 3 is empty and $\beta$ is a constant that depends on the actual local coupling between the transmitting coil, the molten metal and the receiving coil. The sensitivity function $f(h)$ will depend on the configurations of the individual line segments, i.e. the distribution of the spacing area 7 as a function of filling level h. Thereby, the total response (the transfer function) is a function of the vertical filling level of molten metal in the cavity. As the filling level changes with time, so does the total response. The above relation is approximately valid even if the line segments do not form perfect on/off switches.

It is realized that any monotonically decreasing transfer function may be obtained by proper layout of the coil arrangement 4. As realized from FIG. 1, the use of a slanted conductor pair enables the coil arrangement 4 to interact with a large part of the cavity 3.

Furthermore, it is currently believed that it may be desirable to avoid that the coil arrangement 4 has a substantial extent in the horizontal direction, since this may cause the electromagnetic field generated around the horizontal transmitting conductor 5 to induce voltages in the slanted conductor pair. Thus, it is currently believed that the horizontal extent of the conductor pair should be less than about 1/10, and preferably less than about 1/15 or 1/20, of the total length of the conductor pair.

Figure 4:
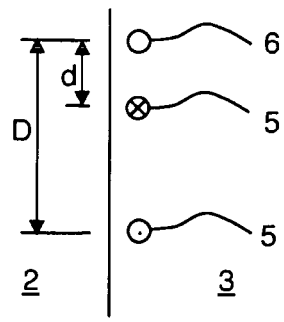
FIG. 4 is a horizontal section view of a conductor pair and another part of the conductor pair.

As explained in the Summary section there are a number of available design criteria that may be applied to ensure that the electromagnetic coupling is local. A further design criterion is illustrated in FIG. 4, namely to ensure that the receiving conductor 6, in all geometric planes that extend perpendicular to the receiving conductor 6, is sufficiently spaced from other parts of the transmitting conductor 5. This distance D, indicated in FIG. 4, may be required to be at least 3 times the mutual spacing, and possibly at least 4, 5, 6, 7, 8, 9 or 10 times the mutual spacing.

Figure 5:
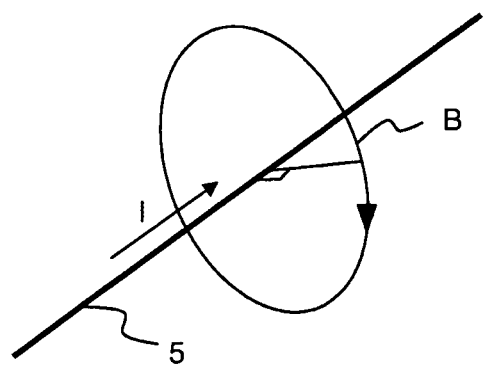
FIG. 5 is a perspective view of the magnetic field generated around a conductor of infinite length.

It may also be desired to ensure a smooth extent of the conductor pair around the periphery of cavity 3. For example, it may be desirable to avoid sharp turns along the extent of the conductor pair. According to another design criterion, the extent of the conductor pair along the loop is such that the generated electromagnetic field at the receiving conductor 6 may be approximated by the electromagnetic field around a straight conductor of infinite length, e.g. as shown in FIG. 5. For example, the mutual distance d may be is selected such that the local extent of the transmitting conductor 5, as seen from any position along the receiving conductor 6, may be approximated by a straight conductor.

It is also to be noted that the response within a specific region may be tuned e.g. by locally modifying the mutual distance d. For example, the mutual distance d may be increased where the conductor pair is turned (e.g. at corners) so as to locally reduce the response of the coil arrangement 4.

Figure 6A:
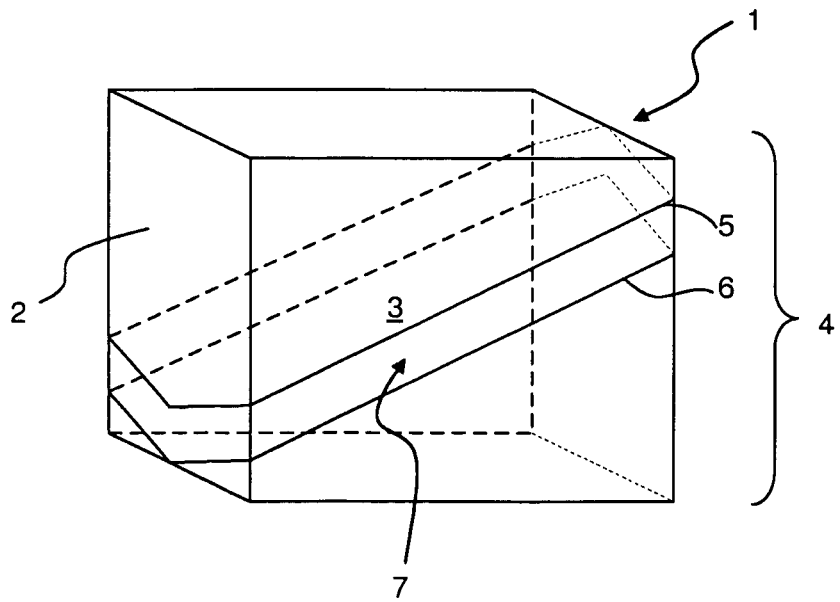
FIGS. 6A-6C are example layouts of the conductor pair for different shapes of the containment volume.

The coil arrangement 4 may be designed for any shape of the cavity 3 and installed in the vessel 1 to allow detection over any desired vertical measurement range, e.g. all the way from a given height to the bottom of the vessel 1. Using certain design criteria, as outlined above in the Summary section, a linear transfer function may be achieved over the desired measurement range and without any turning points. According to one such criterion, the coil arrangement 4 is designed to maintain an essentially constant sensing length as a function of height, where the sensing length is the aggregated extent of the spacing area 7 along the conductors 5, 6 within a horizontal slice taken at each height within the measurement range. It is realized that this criterion is fulfilled within the slanted portion of the coil arrangement 4 in FIG. 1, but is violated at the top and bottom portions, which extends horizontally across the entire depth of the vessel 1. Thus, the coil arrangement 4 in FIG. 1 is able to provide a linear response within the slanted region, but is likely to produce non-linearity and turning points at the top and bottom portions. FIG. 6A is a perspective view of a modification of the coil arrangement 4 in FIG. 1 so as fulfill the above criterion along the entire vertical extent of the coil arrangement 4 and thereby produce a linear response without turning points.

Figure 6B:
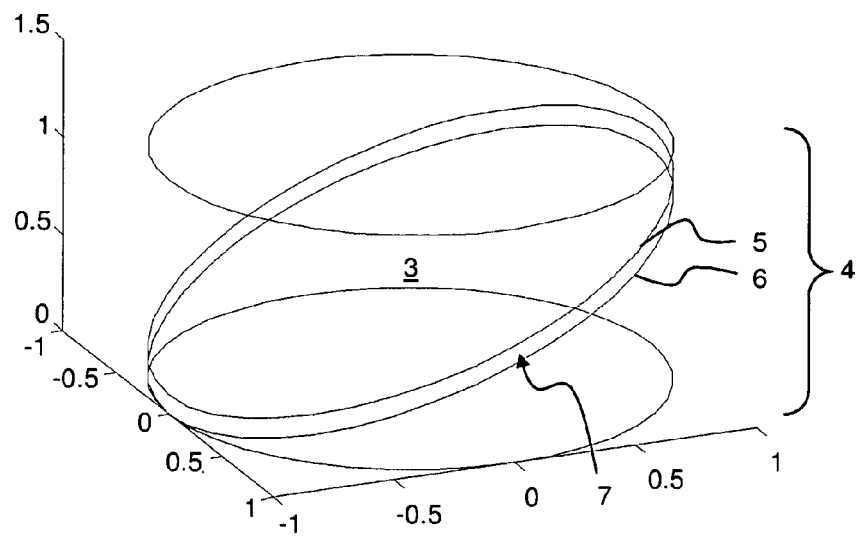
Figure 6C:
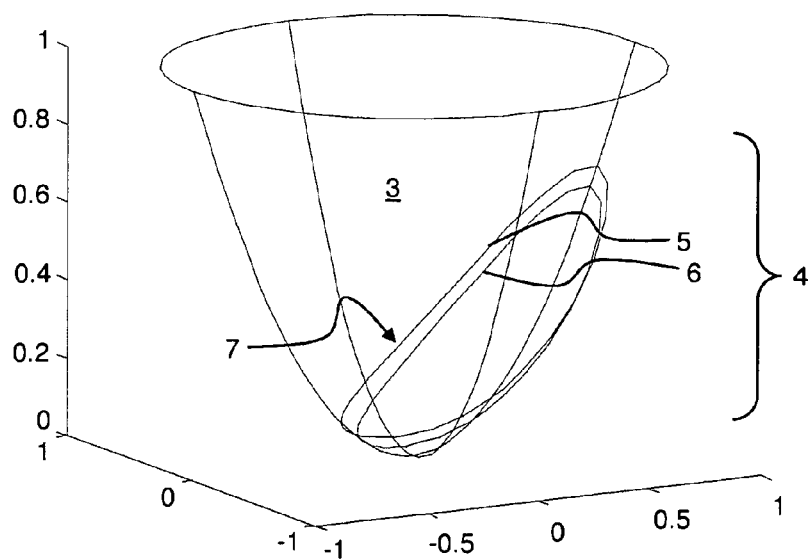

FIGS. 6B and 6C are perspective views of coil arrangements 4 that fulfill this criterion and may produce linear response without turning points in a cylindrical cavity 3 with circular cross-section and a cavity 3 with a spherical wall portion, respectively. It is to be understood that these cavity shapes are only included for the purpose of illustration, and that coil arrangements 4 may be designed to fulfill the above criteria irrespective of cavity shape.

Figure 7:
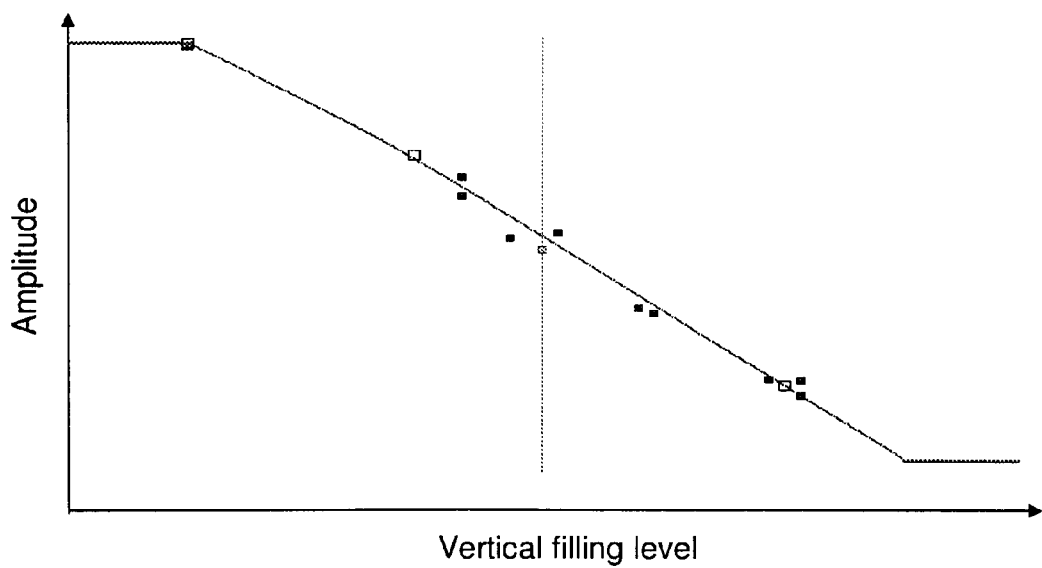
FIG. 7 is a graph of signal amplitude as a function of level obtained for the layout in FIG. 6A.

FIG. 7 is a graph of a response curve (transfer function) for the coil arrangement 4 in FIG. 6A, given as amplitude in a voltage signal obtained from the receiving conductor 6 as function of filling level in the vessel 1. As seen the response is linearly dependent on filling level within the measurement range, which coincides with the vertical extent of the coil arrangement 4, and is invariant of filling level outside the measurement range.

Compared to prior art techniques that are largely non-linear and exhibit turning points, the embodiments in FIG. 6 may lead to a significant improvement of the measurement performance on violent surfaces that change on a time scale comparable to, or fasten than, the frequency of the electromagnetic field (i.e. the frequency of the alternating current supplied to the transmitting conductor 5). Even rapid perturbations are averaged by their electromagnetic interaction with the coils such that a valid time-average may be calculated for a set of consecutive samples.

Figure 8:
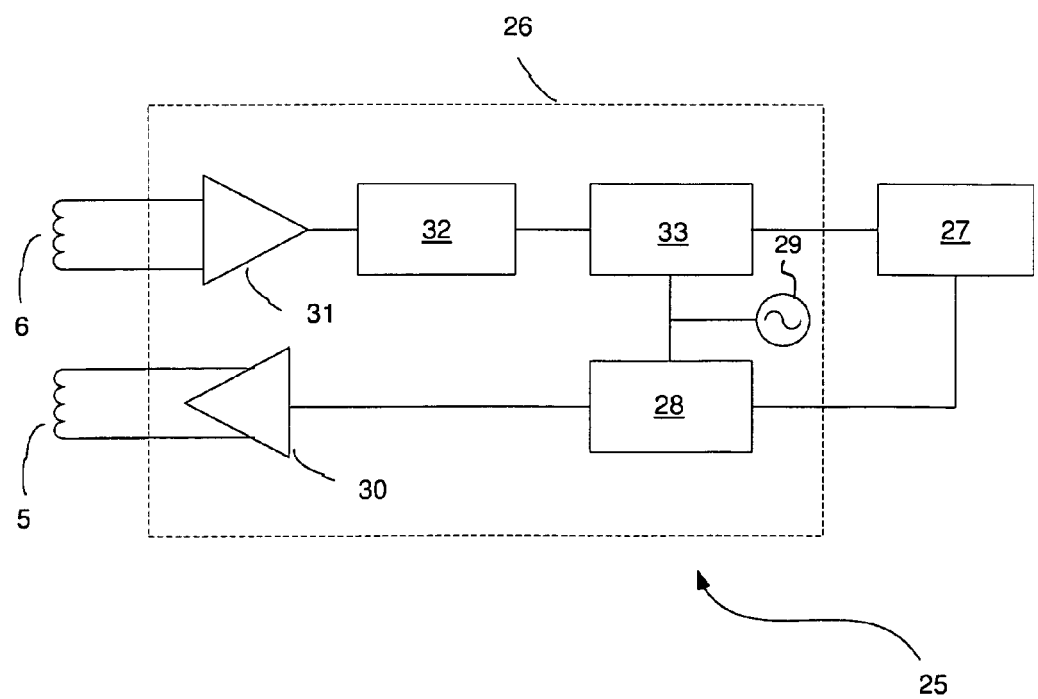
FIG. 8 is a block diagram of a conductor pair connected to a processing unit for signal generation and data collection.

FIG. 8 is a block diagram of an embodiment of a processing unit 25 connected to the transmitter and receiver conductors 5, 6 for generating a measure of the vertical filling level (cf. FIG. 7). The dotted box forms a transceiver 26 with circuitry for driving the transmitter conductor 5 and for obtaining an output signal from the receiver conductor 6. A signal processor 27 is connected to the transceiver 26 to extract the measure of the vertical filling level from the output signal. In the example of FIG. 8, a direct digital synthesizer (DDS) 28 is configured to create a suitable waveform, e.g. a sinusoid, at a desired frequency based on a common reference clock 29. Depending on implementation, the frequency may be in the frequency range of about 50 Hz to 100 kHz. The output of the DDS 28 is supplied to a power amplifier 30 which thereby supplies an alternating steady-state current signal of suitable magnitude to the transmitter conductor 5. A preamplifier 31 is connected to detect and amplify an alternating voltage over the receiver conductor 6. After filtering in a dedicated band-pass filter 32, the amplified voltage signal is processed by synchronous analog-to-digital conversion in an analog-to-digital converter (ADC) 33. Thereby, the ADC 33 may supply an output signal comprising information about phase and/or amplitude of the detected voltage. Depending on implementation, the measure of vertical filling level may be calculated as a function of the phase or the amplitude of the detected voltage, or a combination thereof. This is well-known to the person skilled in the art.

Figure 9:
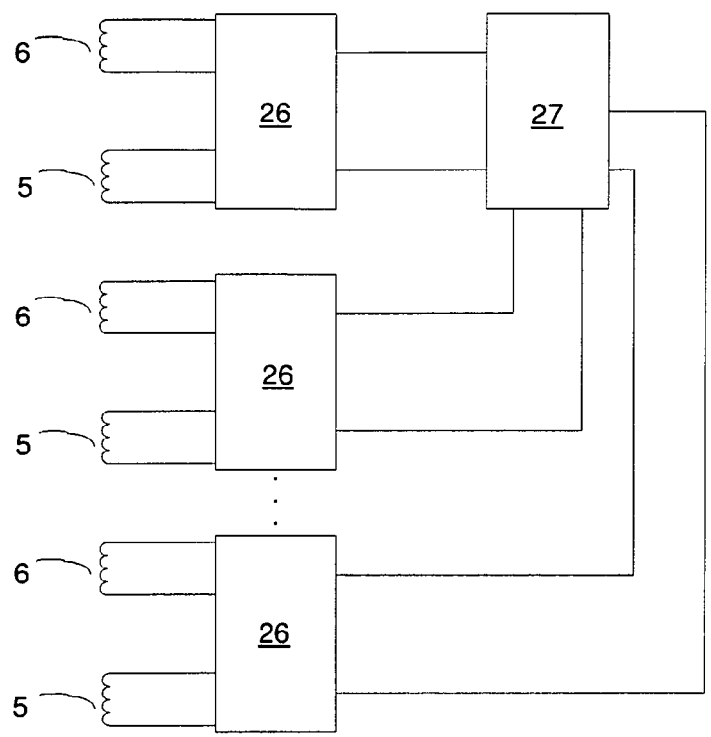
FIG. 9 is a block diagram of plural conductor pairs connected to a processing unit.

It should be understood that the technique is not limited to using a single conductor pair. Instead, two or more conductor pairs may be installed e.g. to provide measurement ranges at different heights of the vessel and/or to provide different transfer functions. FIG. 9 illustrates such an embodiment with a number n of different conductor pairs arranged to form a respective loop around the cavity of a metallurgical vessel. In the embodiment of FIG. 9, each pair of conductors 5, 6 is connected to a respective transceiver 26, and the output signals of the transceivers 26 are processed by a common signal processor 27. In the embodiment of FIG. 9, the transceivers 26 may operate at different frequencies.

Drift is inherent in all types of electromagnetic sensors due to changes in the geometry of the vessel 1, e.g. caused by temperature changes, lining wear and material inclusions. It has been found that the inventive measurement system is advantageously insensitive to such drifts since the transfer function of the coil arrangement 4 is relatively unaffected by the associated changes in the geometry. For moderate changes in geometry, the transfer function is merely shifted, causing a linear shift of the response curve. Thus, with a simple transfer function (e.g. linear) one or two calibration points are sufficient to compensate the output signal for drifts. Such a calibration point may e.g. be obtained by including a conductor pair that extends horizontally around the cavity to form a horizontal conductor pair. The voltage over the horizontal conductor pair decreases significantly and abruptly (step change) when the filling level reaches the horizontal conductor pair, and the vertical position of the step change will be essentially unaffected by geometric changes. It is realized that a linear response curve of slanted conductors may be compensated for unknown shifts, by mapping the measured response from the slanted conductors at the location of the step change to the linear response curve. Further calibration points may be included to account for changes to the inclination of the linear response curve, or to compensate for drifts when the response curve is partially non-linear. It is to be understood that the horizontal conductor pairs (calibration coils) may be controlled by separate transceivers connected to a common signal processor, as described in relation to FIG. 9.

Figure 10:
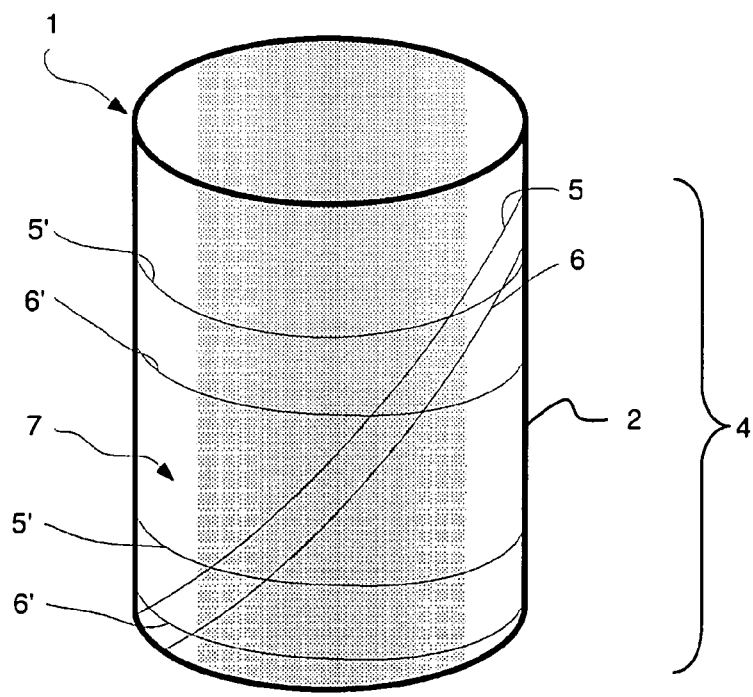
FIG. 10 is a perspective view of a combination of a slanted conductor pair and horizontal conductor pairs.
Figure 11:
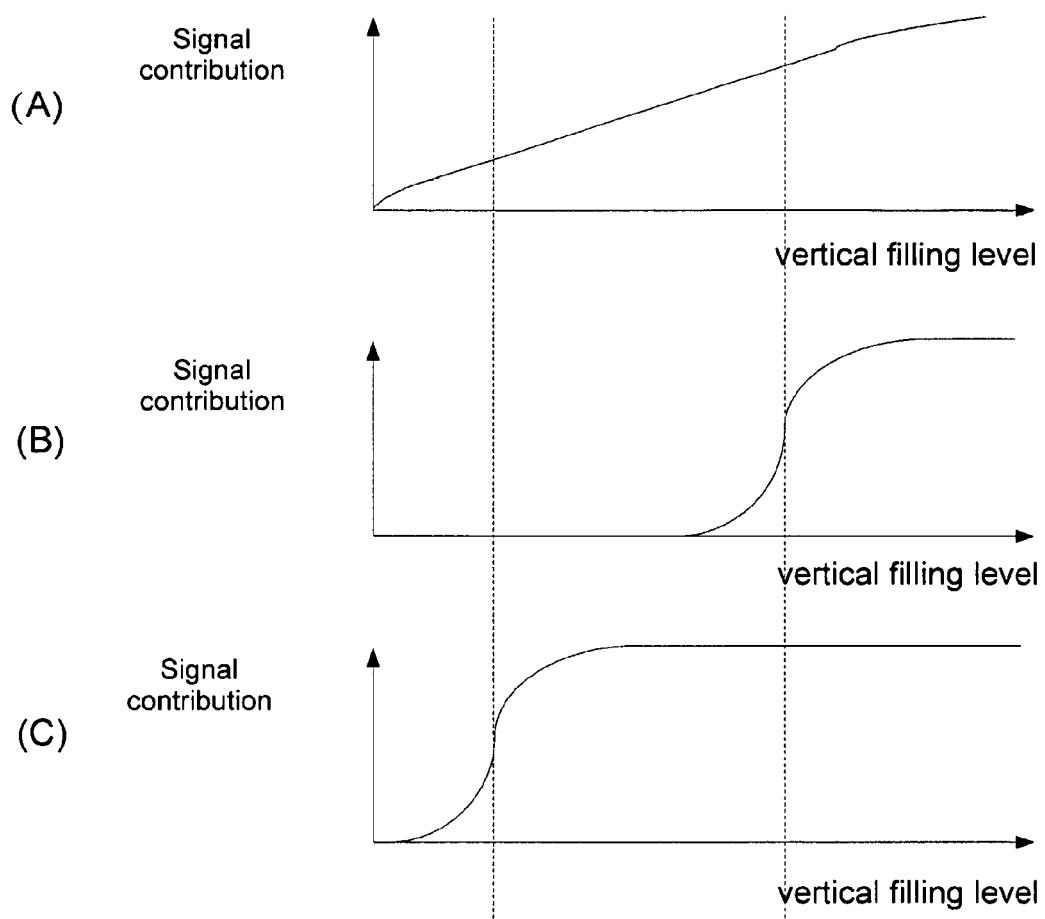
FIGS. 11A-11C are graphs of a sensitivity function for the different conductor pairs in FIG. 10.

FIG. 10 illustrates an example of a coil arrangement 4 that provides a linear transfer function and two inherent calibration points. The coil arrangement 4 comprises one pair of slanted conductors 5, 6 that extends over a vertical measurement range and two horizontal pairs of conductors 5', 6' arranged at different vertical levels within the measurement range. This embodiment allows for calibration of the full measurement range each time the filling level passes the horizontal pairs of conductors 5', 6'. FIGS. 11A-11C illustrate the sensitivity function $f(h)$ for the slanted conductor pair, the top horizontal conductor pair and the bottom horizontal conductor pair, respectively, relative to vertical filling level. As explained above, the sensitivity function $f(h)$ represents the signal contribution originating from eddy currents in the molten metal along the spacing area 7.

While the invention has been described in connection with what is presently considered to be the most practical and preferred embodiments, it is to be understood that the invention is not limited to the disclosed embodiments, but on the contrary, is intended to cover various modifications and equivalent arrangements included within the spirit and the scope of the appended claims.

For example, the transmitting conductor and the receiving conductor may each be formed by a single wire or by plural wires.

It is also to be understood that the loop formed by the co-extending pair of conductors may be supplemented by one or more further transmitter conductors and/or receiver conductors which are arranged to co-extend with and be spaced from the loop.

Further, the invention as described herein may be equally applicable for level measurements in metallurgical vessels with non-metal casing, e.g. a casing of ceramic material.

The invention claimed is:

1. A system for measuring a vertical filling level of electrically conductive material in a containment volume of a metallurgical vessel, the metallurgical vessel being defined by an outer metal casing that surrounds the containment volume and extends in a vertical direction, the system comprising:
a transmitting conductor for generating an electromagnetic field when connected to an alternating power source,
a receiving conductor which is arranged to sense the electromagnetic field for generation of an output signal as a function of the vertical filling level,
wherein the transmitting and receiving conductors are arranged inside the metal casing to co-extend with a mutual spacing to define a spacing area that faces the containment volume and extends along a periphery of the containment volume in a closed loop, wherein the mutual spacing is selected such that changes in the output signal is dominated by changes to the electromagnetic field caused by local changes in an amount of the conductive material adjacent to said spacing area, and wherein at least part of the spacing area defines a vertical measurement region in which the spacing area is slanted along the periphery so as to diverge from horizontal and vertical directions of the vessel.

2. The system of claim 1, wherein the mutual spacing is selected to ensure that electromagnetic coupling between the transmitting and receiving conductors is primarily achieved between opposing segments of the transmitting and receiving conductors along the spacing area.

3. The system of claim 1, wherein the mutual spacing is selected such that a strength of the electromagnetic field, in absence of conductive material in the containment volume, falls as a function of $1/R^\alpha$, with R being a distance from the transmitting conductor in the spacing area and $\alpha$ being in the range of 1-2.

4. The system of claim 1, wherein the spacing area is arranged such that the electromagnetic field at the receiving conductor, with respect to the transmitting conductor and in absence of conductive material in the containment volume, is approximated by an electromagnetic field generated around a straight conductor of infinite length.

5. The system of claim 1, the transmitting conductor is arranged such that its horizontal extent is less than about 1/10 of a total length of the transmitting conductor.

6. The system of claim 5, wherein the transmitting conductor is arranged to be free of portions with a horizontal extent.

7. The system of claim 1, wherein the metallurgical vessel further comprises a protective lining arranged inside the metal casing so as to define an inner wall spaced from the metal casing and defining the periphery of the containment volume, wherein the transmitting and receiving conductors are arranged with a horizontal separation between the spacing area and the inner wall, wherein the mutual spacing is selected to be at least of the same order of magnitude as the horizontal separation.

8. The system of claim 1, wherein the transmitting conductor is arranged such that an average strength of the electromagnetic field in the conductive material at the periphery of the containment volume facing the spacing area is independent of vertical position within the vertical measurement region.

9. The system of claim 1, wherein the mutual spacing is selected such that a horizontal distance from the receiving conductor to the periphery of the containment volume is invariant within the vertical measurement region.

10. The system of claim 1, wherein the spacing area is arranged so as to yield approximately the same sensing length for different heights in the vertical direction within the vertical measurement region, the sensing length being the total extent of the spacing area along the transmitting and receiving conductors within a horizontal slice taken at a given height in the vertical direction.

11. The system of claim 1, wherein the spacing area is arranged such that a total electromotive force induced in the receiving conductor by the electromagnetic field is a linear function of the vertical filling level in the vertical measurement region.

12. The system of claim 1, wherein the spacing area is arranged such that a total electromotive force induced in the receiving conductor by the electromagnetic field is invariant of the vertical filling level when the vertical filling level extends outside the vertical measurement region.

13. The system of claim 1, wherein the vertical measurement region spans an extent of the loop in the vertical direction.

14. The system of claim 1, wherein the mutual spacing is the same along the spacing area within the vertical measurement region.

15. The system of claim 1, wherein the transmitting and receiving conductors are arranged such that the loop encloses a vertical center line of the containment volume.

16. The system of claim 15, wherein the containment volume is at least partially defined by a cylindrical wall portion extending around the vertical center line, wherein the loop is formed in the cylindrical wall portion so as to surround the containment volume.

17. The system of claim 1, further comprising at least one further transmitting conductor for generating an electromagnetic field when connected to an alternating power source, and at least one further receiving conductor which is arranged to sense the electromagnetic field for generation of a further output signal, wherein the at least one further transmitting conductor and the at least one further receiving conductors are arranged inside the metal casing at a vertical position within the vertical measurement region, to co-extend horizontally around the containment volume with a mutual spacing.

18. The system of claim 1, further comprising an alternating power source connected to the transmitting conductor.

19. The system of claim 1, further comprising a processing unit configured to obtain and process the output signal for extracting a measure representative of the vertical filling level.

20. A metallurgical vessel comprising:
- a metal casing defining an inner cavity providing a containment volume which extends in a vertical direction; and
- a system for measuring a vertical filling level of electrically conductive material in the containment volume of the metallurgical vessel, the system comprising:
  - a transmitting conductor for generating an electromagnetic field when connected to an alternating power source, and
  - a receiving conductor which is arranged to sense the electromagnetic field for generation of an output signal as a function of the vertical filling level,
- wherein the transmitting and receiving conductors are arranged inside the metal casing to co-extend with a mutual spacing to define a spacing area that faces the containment volume and extends along a periphery of the containment volume in a closed loop, wherein the mutual spacing is selected such that changes in the output signal is dominated by changes to the electromagnetic field caused by local changes in an amount of the conductive material adjacent to said spacing area, and
- wherein at least part of the spacing area defines a vertical measurement region in which the spacing area is slanted along the periphery so as to diverge from horizontal and vertical directions of the vessel.

21. A method of measuring a vertical filling level of electrically conductive material in a containment volume of a metallurgical vessel, the metallurgical vessel being defined by an outer metal casing that surrounds the containment volume and extends in a vertical direction, the method comprising:
- installing a transmitting conductor to generate an electromagnetic field inside the metallurgical vessel, and
- installing a receiving conductor inside the metallurgical vessel to sense the electromagnetic field for generation of an output signal as a function of the vertical filling level,
- wherein the transmitting and receiving conductors are installed inside the metal casing to co-extend with a mutual spacing to define a spacing area that faces the containment volume and extends along a periphery of the containment volume in a closed loop, wherein the mutual spacing is selected such that changes in the output signal is dominated by changes to the electromagnetic field caused by local changes in an amount of the conductive material adjacent to said spacing area, and wherein at least part of the spacing area is arranged to define a vertical measurement region in which the spacing area is slanted along the periphery so as to diverge from horizontal and vertical directions of the vessel.

22. A method of operating the system as set forth in claim 1, said method comprising:
- supplying an alternating power to the transmitting conductor,
- obtaining the output signal from the receiving conductor, and
- processing the output signal for extracting a measure representative of the vertical filling level.

* * * * *